United States Patent [19]

Mata-Garza

[11] 4,405,087

[45] Sep. 20, 1983

[54] FLUID MIXING TECHNIQUE

[76] Inventor: Antonio Mata-Garza, Jamaica 401, Col. Vista Hermosa, Monterrey, N.L., Mexico

[21] Appl. No.: 283,896

[22] Filed: Jul. 20, 1981

Related U.S. Application Data

[63] Continuation-in-part of Ser. No. 102,861, Dec. 12, 1979, Pat. No. 4,298,015.

[51] Int. Cl.³ .......................... B05B 3/04; B05B 7/30
[52] U.S. Cl. .................................. 239/226; 137/890;
137/896; 239/240; 239/405; 366/165; 366/168;
366/173; 366/280; 417/171
[58] Field of Search ............... 366/165, 168, 173, 177,
366/280; 417/88, 171; 137/888, 890, 896;
239/7, 10, 226, 240, 310, 318, 403, 405, 406

[56] References Cited

U.S. PATENT DOCUMENTS 2,984,420  5/1961  Hession, Jr. ................... 239/405
3,512,719  5/1970  Phelps et al. ................. 239/405

FOREIGN PATENT DOCUMENTS 1257000  12/1971  United Kingdom ............... 239/226

Primary Examiner—Andres Kashnikow
Attorney, Agent, or Firm—Laurence R. Brown

[57] ABSTRACT

One non-propelled fluid resident in a reservoir is sucked into the flow path of a further fluid in transit propelled by fluid pressure. This is achieved by means of inducing a spiral cyclone path flow pattern in the propelled fluid to create a converging vortex with a turbulent mixing zone into a linear output transit line. The pressure at the vortex zone is reduced significantly from atmospheric to thereby produce a strong suction propellant force bringing the stored fluid into the turbulence mixing zone. The stored fluid is introduced axially in line with the cyclone axis and linear output transit line which receives thoroughly mixed fluids in substantially constant proportions over significant changes in pressure of the propelled fluid. Thus, the mixer device is ideal for dispensing insectides with a garden hose, detergents into a dishwasher, chlorine into a swimming pool, etc. One embodiment therefore provides for a rotary fluid driven turbine with a rotary spray head as a medium for inducing the cyclone shaped spiral flow path with converging vortex and simultaneously spraying the mixed fluids.

11 Claims, 6 Drawing Figures

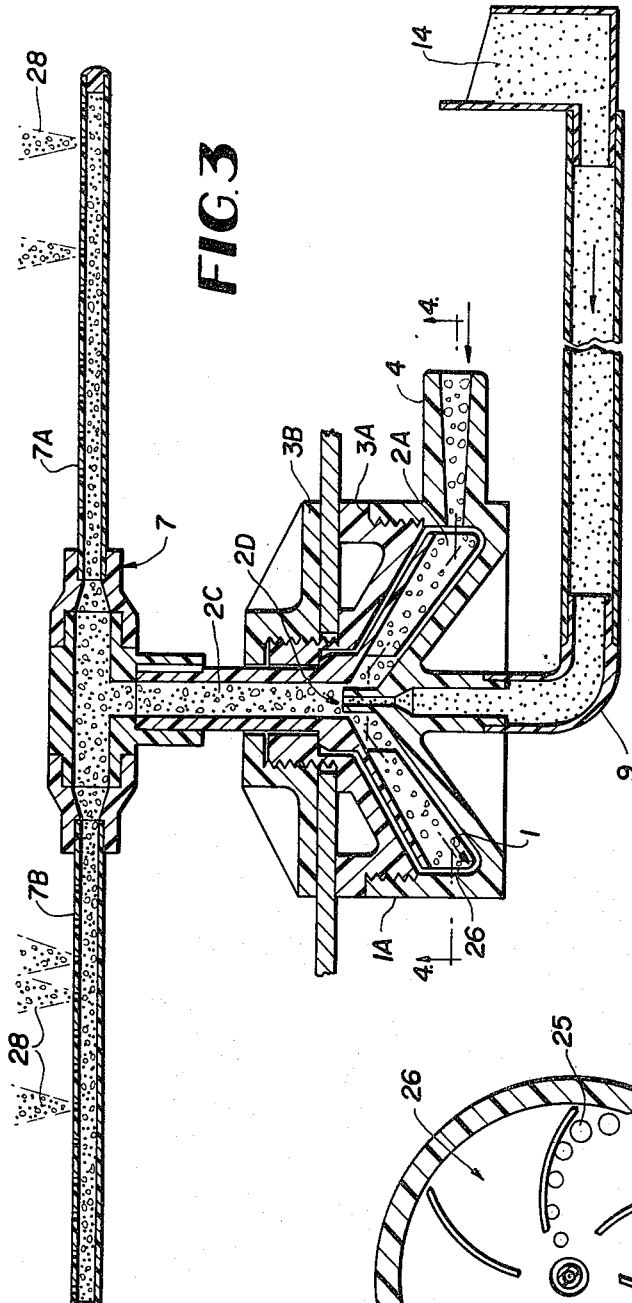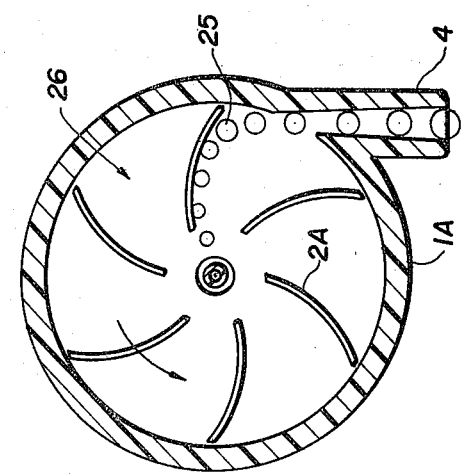

FLUID MIXING TECHNIQUE

TECHNICAL FIELD

This application is a continuation-in-part of the copending application of this applicant entitled Dishwasher, U.S. Ser. No. 102,861, filed Dec. 12, 1979, now U.S. Pat. No. 4,298,015.

This invention relates to mixing of two fluids and more particularly it relates to the mixing of two fluid substances by suction of one unpropelled fluid into the transit path of a fluid propelled under pressure.

BACKGROUND ART

It has been customary to use a venturi device for sucking a resident fluid from a reservoir into a fluid flow path. This has the disadvantages of low suction, inability to control the proportions of the two fluids particularly with changing fluid pressures and very poor mixing qualities. Also the introduced fluids are inserted perpendicularly causing a directional transition and awkward flow path configurations.

It is thus an objective of this invention to improve the state of the art by eliminating the foregoing disadvantages.

For precise instrumentation and control of such functions as feeding detergents into dishwashing machines, insecticides and fertilizer into an irrigating spray, chlorine into a swimming pool, etc., it is necessary to feed unpropelled fluids from a resident reservoir in a convenient flow path at increased suction forces under conditions assuring a predetermined proportioning of the two fluids over various fluid flow pressures in the fluid flow path.

Also a fluid feed path for the unpropelled liquid permitting thorough mixing over a short transit path is necessary for compact self contained mixing apparatus and incorporation into nozzles, spray heads, rotary dispensers, or the like for processing the mixed fluids.

Other objectives, features and advantages of the invention will be found throughout the following description, drawings and claims.

DISCLOSURE OF THE INVENTION

There is provided by this invention a technique for mixing an unpropelled fluid resident in a reservoir, such as a detergent, fertilizer or insect treatment liquid into a stream of fluid propelled by a pressure head such as water from a line. In accordance with this invention the propelled fluid is caused to flow in a spiral cyclone shape pattern defining a converging vortex along an axis leading into a linear flow path. This creates a turbulence zone at the converging vortex zone at which the pressure is significantly decreased over ambient pressure outside the cyclone. Thus, a conveyance pipe positioned with one end in the decreased pressure zone can by suction withdraw the second non-propelled fluid from a reservoir at ambient pressure into the flow stream and thoroughly mix it thereinto in the turbulence zone. A much higher suction force is obtained than in the conventional venturi type suction means and fluid can be passed from the non-propelled fluid reservoir with the fluid flow path along the cyclone axis rather than requiring a perpendicular connection thereto as required by venturi suction type devices.

Precise control of the proportions of fluids resident in reservoir which are mixed into a flowing fluid in transit result from establishment of a proportional suction force that remains substantially constant even with variations of transit fluid pressure.

BRIEF DESCRIPTION OF THE DRAWINGS

In the drawings:

FIG. 3 is a sectional view in elevation showing diagrammatically the flow, mixing and spray paths of two fluids through the mixing spray embodiment of FIG. 1;

FIG. 4 is a cut-away top view partly in section showing the rotor blade configuration along lines 4—4 of FIG. 3;

FIG. 5 is an elevation sketch of a further spray-mixer embodiment of the invention.

PREFERRED EMBODIMENTS OF THE INVENTION

Figure 1:
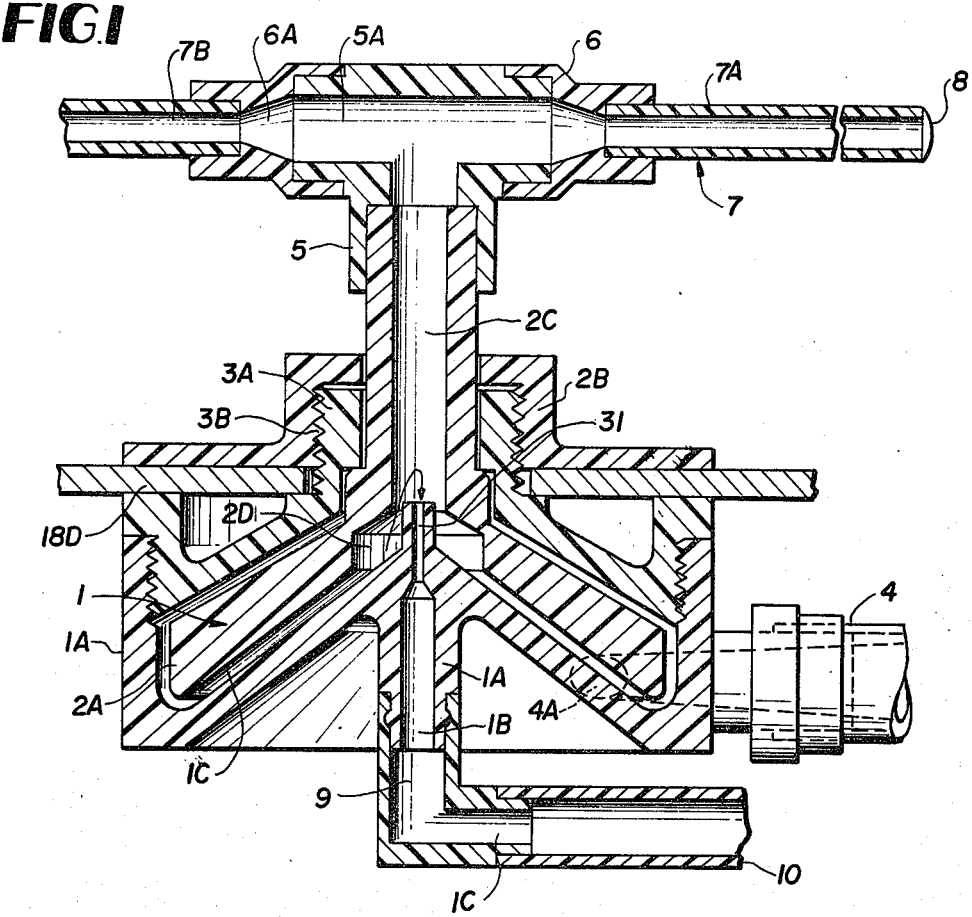
FIG. 1 is an elevation sectional view of a rotatable mixing spray embodiment of the invention.

FIGS. 1 to 5 are directed to an embodiment of the invention that provides a rotary spray head 7 powered by fluid pressure. Throughout these views, like reference characters are used to represent similar features. Primes are used to show optional variations of features shown in other views. Fluids as used in this invention includes gases and liquids where applicable.

In general the first fluid source under pressure which flows through the mixer transit paths is typically a water supply connected at the coupled water line 4. The second resident non-propelled fluid source to be mixed into the flow path of the fluid under pressure is typically the detergent liquid in storage reservoir 14 of FIG. 2.

This embodiment of the invention comprises a fluid powered turbine 1 which rotates the spray head 7, and which is driven by impact of the fluid upon curved rotor blades 2A as seen best by the diagrammatic fluid flow path shown in FIG. 4 as fluid enters typically from the water line 4.

Figure 2:
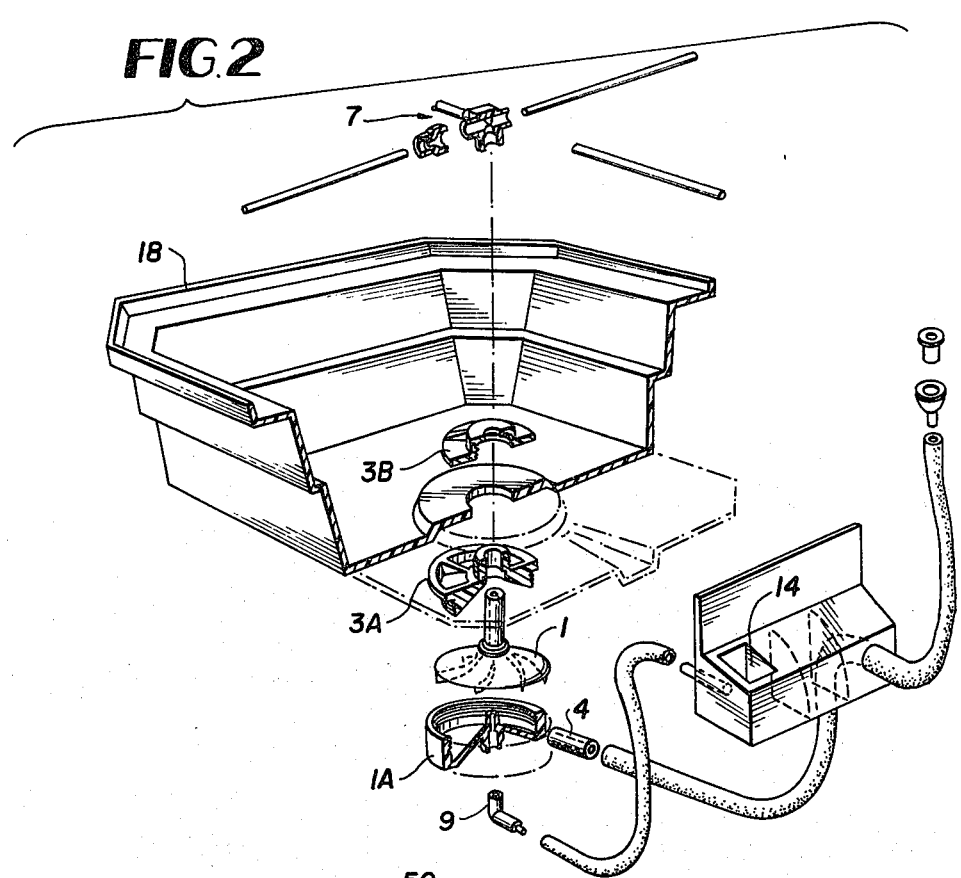
FIG. 2 is a perspective sketch, partly broken away, shown in exploded form, of a dish washing machine embodiment of the invention incorporating the rotatable spray of FIG. 1.

As seen in FIG. 2 a dishwasher tub 18 assembly has the rotary spray mixer replaceably mounted therein and accessible for ready repair and maintenance because of the various screw interconnected parts comprising retaining cap 3B, housing members 1A and 3A and the rotary turbine 1 and the frictionally fitting spray head 7.

It is seen therefore that the spray head provides a mixture of water and detergent for cleaning dishes as set forth more completely in the parent application hereinbefore identified.

The fluid energy is transformed into mechanical energy by the turbine 1, shown in FIG. 1, having blades 2A of a turbine rotor disposed within housing 1A. The housing is preferably of plastic and is so cross sectioned since plastic is easier to form, is self lubricating and does not tend to corrode. However, portions may be made of metal if desired.

Cross piece 5 of the rotatable spray head 7 is frictionally joined to the turbine rotor shaft for rotation therewith of the extension spray arms 7A, 7B all being hollow such as turbine shaft piping 2C to process the two fluids mixed at the turbulent converging vortex zone of reduced pressure 2D, which also draws fluid into line 10, elbow 1C, pipe 9 and into the spray head pipe 2C.

Spray holes extend through the upper part 7A of the rotary spray head 7. The reduction fitting 6 has a conical piping section 6A to produce a higher fluid flow speed and pressure spray force out of the holes in arms 7A. Each spray arm has an end cap 8. The T-fitting 5 with piping 5A is splined or otherwise affixed to the turbine shaft to rotate therewith.

Water under pressure enters at water line 4 into the orifice 4A to hit turbine rotor vanes 2A and propel them. The inclined inner turbine blade walls 1C of the turbine housing 1A also pass water up an incline and in a spiral path forming a cyclone shaped flow pattern with an axis along pipe 2C and converging into a vortex at zone 2D as flow enters the vertical piping 2C of the turbine shaft suitably mounted within retaining cap 3B and housing members 3A and 1A holding the turbine assembly on the bottom center 18D of the washer tub assembly. When the fluid hits the inclined wall 1C it generates two force components causing a spiral flow path, namely, a horizontal speed component that increases the rotor speed and a vertical speed component greater than the horizontal speed which passes turbulence chamber 2D, vertically flows through piping 2C and leaves spray holes 7A. The water supply may be turned off and on by an appropriate control device.

The turbulence chamber 2D generates a much greater decrease in pressure (vacuum) in jet pipe 1B than possible in a venturi arrangement, which pulls or sucks and mixes with incoming water detergent or soap liquid from around elbow 9, passage 1C and piping 10 from the front panel accessible detergent storage reservoir 14.

In FIGS. 3 and 4 the mixing and suction action of this invention is diagrammed. Thus, circles 25 diagrammatically show the flow of fluid under pressure in their impact path on rotor blades 2A to rotate the rotor 1 by fluid pressure in the housing cavity 26 between housing membes 1A and 3A.

The resident non-propelled fluid in the reservoir 14 is denoted by + and the propelled fluid flowing under a head of pressure is denoted by 0. As the rotor 1 rotates, it imparts a spiral upward flow within cavity 26 forming a cyclone type pattern converging at a vortex position 2D along its axis before dispersing along linear piping path 2C. This creates a turbulence zone 2D of low pressure serving to suck up the fluid from reservoir 14 and mixing it thoroughly for transit out of the mixer zone into rotary spray head 7 in this embodiment for spray 28 out the apertures in spray arms 7A, 7B.

As may be seen from FIG. 5, the mixing apparatus because of known proportioning of the resident fluid reservoir 14' with fluid flow in water line 4 can serve as a spray dispenser for irrigating gardens while mixing in liquid insecticides or fertilizers. Precise control of the constituents of fluid 30 in reservoir 14 and the injection pipe 31 (FIG. 1) dimensions and location in turbulence zone 2D can permit precise proportioning of critical fluids even when water pressures change considerably.

Figure 6:
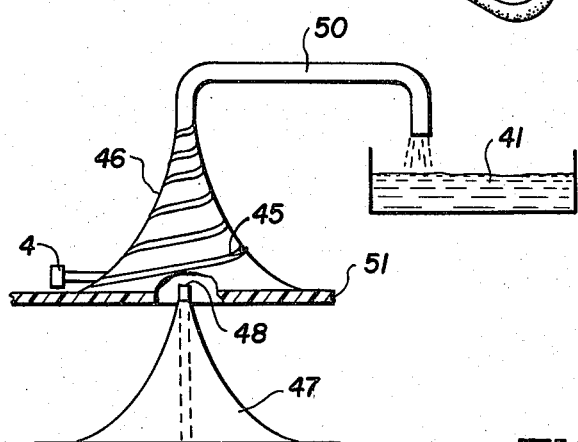
FIG. 6 is a cut-away elevation sketch of a further embodiment of the invention for mixing two fluids.

A further embodiment is shown in FIG. 6 where for example a chlorine solution 40 in reservoir 14' can be dispensed into a swimming pool 41 in a known concentration.

In this embodiment the cyclone pattern of fluid flow into line 4 is attained by the spiral grooves 45 in the mixer housing 46 into which the injection line plug 47 mates and is sealed by packing layer 51. Thus, injection tube 48 is placed at the vortex turbulence zone to achieve the suction and mixing action of the type hereinbefore described. The output line 50 may be a transit line, nozzle, etc. dependent upon the particular application.

It is evident that this invention has patentably advanced the state of the art and those novel features believed descriptive of the spirit and nature of this invention are defined with particularity in the claims.

INDUSTRIAL APPLICATION

A mixing device introduces non-propelled fluid from a reservoir, such as insectide, detergent, fertilizer or chlorine, into the flow path of fluid under pressure such as water from a line in assured proportions over changes in pressure and with significant suction force and thoroughly mixes the two fluids. Water driven rotary spray or nozzle heads can dispense the mixed fluids from the mixing site by means of simple compact apparatus made possible by in-line feed of the non-propelled fluid into the transit path of the propelled fluid under pressure.

I claim:

1. Mixing apparatus comprising in combination, conveying means providing a conduit path for incoming fluid of a first characteristic under pressure converging in a cyclone shaped flow pattern from an input port to an output port comprising a rotary turbine member rotatable by the fluid under pressure in said conduit path, and mixing means providing a second fluid conduit path for conveying a fluid of a second characteristic under motive power of the suction provided by the cyclone pattern of the first fluid path at a converging vortex position having an input port for access to a fluid supply external to said cyclone conduit path and an output port located in the converging vortex position of said cyclone path thereby to provide suction for supplying said second fluid into the conveyance path of said first fluid for mixing therewith.

2. Apparatus as defined in claim 1 wherein said rotary turbine member rotates a spray arm which conveys the two fluids mixed in said vortex position.

3. Apparatus as defined in claim 2 wherein the apparatus comprises a lawn sprinkler adapted to mix in with irrigation water a fluid substance such as insect spray or fertilizer.

4. Apparatus as defined in claim 2 wherein the apparatus comprises a dishwasher in combination with means to spray dishes with said spray arm and to supply a detergent to said mixing means as the second fluid.

5. Apparatus as defined in claim 1 wherein the apparatus comprises an in-line mixer line located along the axial path of said cyclone.

6. Apparatus as defined in claim 5 including a reservoir supply of said fluid of the second type disposed in a container adjacent said cyclone conduit path for mixing with said first type fluid.

7. Apparatus as defined in claim 1 wherein the cyclone pattern is afforded movement in a generally helical flow path by said turbine member.

8. Apparatus as defined in claim 7 wherein said movable member comprises a turbo blade adapted to be driven by said first type fluid under pressure and having blades disposed in a conical array in a converging housing thereby imparting said cyclone type pattern.

9. Apparatus as defined in claim 1 wherein the mixing apparatus is in a housing containing said converging cyclone flow path, and the means providing the cyclone flow path comprises said rotating turbine member positioned within a mating compartment in said cavity proportioned to provide for rotation of said turbine within said compartment on a surrounding fluid bearing.

10. Apparatus as defined in claim 1 wherein the mixing apparatus is contained in a housing comprising two members interconnected by screw threads defining thereby a compartment comprising said conduit path converging in said cyclone shaped flow pattern.

11. Apparatus as defined in claim 10 including said turbine member rotatably positioned in said compartment by flow of fluid therethrough.

* * * * *